(12) United States Patent
Yamada (10) Patent No.: US 6,687,811 B1
(45) Date of Patent: Feb. 3, 2004

(54) PROCESSOR WITH TRACE MEMORY FOR STORING ACCESS INFORMATION ON INTERNAL BUS

(75) Inventor: Akira Yamada, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 615 days.

(21) Appl. No.: 09/624,602

(22) Filed: Jul. 25, 2000

(30) Foreign Application Priority Data

Jan. 21, 2000 (JP) .................................. 2000-012719 (P)

(51) Int. Cl.⁷ ............................................... G06F 11/00
(52) U.S. Cl. .......................................... 712/227; 714/45
(58) Field of Search ......................... 712/227; 714/45, 714/25

(56) References Cited

U.S. PATENT DOCUMENTS

| | | | | |
|---|---|---|---|---|
| 5,560,036 A | * | 9/1996 | Yoshida ..................... | 712/227 |
| 5,826,093 A | * | 10/1998 | Assouad et al. .............. | 712/43 |
| 5,978,937 A | * | 11/1999 | Miyamori et al. ............ | 714/45 |
| 6,530,076 B1 | * | 3/2003 | Ryan et al. .................. | 717/128 |
| 6,567,932 B2 | * | 5/2003 | Edwards et al. ............. | 714/30 |
| 6,594,782 B1 | * | 7/2003 | Tagawa ....................... | 714/30 |

FOREIGN PATENT DOCUMENTS

| | | |
|---|---|---|
| JP | 2-208785 | 8/1990 |
| JP | 2-310738 | 12/1990 |

* cited by examiner

*Primary Examiner*—Eric Coleman
(74) *Attorney, Agent, or Firm*—McDermott, Will & Emery (57) ABSTRACT

An internal trace memory is provided in a processor, the internal trace memory, in the trace mode, storing internal bus access information and in the normal operating mode, being used for storage as an internal memory of CPU (Central Processing Unit). The number of input/output data bits of the internal trace memory in the trace mode is set to a value of natural number times a bit width of an internal data bus. The internal trace memory for storing the internal bus access information is incorporated in the processor without increasing chip area thereof.

7 Claims, 10 Drawing Sheets

PROCESSOR WITH TRACE MEMORY FOR STORING ACCESS INFORMATION ON INTERNAL BUS

BACKGROUND OF THE INVENTION

1. Field of the Invention The present invention relates to a processor with an internal trace memory for storing access information on an internal bus.

2. Description of the Background Art

For a processing system operable on a software, such as a processor, debug (error detection and correction) operation such as verification of the software is carried out. In this debug operation, a cause for error generation is detected using the order of execution of instructions of the processor and data information accessed in the execution of the instructions. Collection of such information is generally called tracing of execution of a processor. With this trace information, an actual operating state of the processor can be monitored and a cause for error generation is detected with ease, which makes software debugging performed efficiently.

In order to trace execution of a processor, a trace memory is generally provided externally to a processor (chip), and bus access information such as an address, data and a bus control signal generated by the processor are stored in the trace memory provided externally to the processor and debugging of a software is executed using the stored information.

Storage of bus access information into the trace memory, however, is executed through a dedicated interface circuit or a general interface circuit provided in the processor. When an internal operating frequency of the processor is a high speed of, for example, 200 MHz or 300 MHz, this internal operating speed excels a frequency of the external bus significantly. The interface circuit is provided so as to buffer a difference in operating speed between the external bus and the inside of the processor. When bus access information such as internal data/signals is stored into the trace memory, transfer of the information is carried out at a low speed according to the operating frequency of the external bus. Therefore, the bus access information cannot be stored into the trace memory at the internal operating speed of the processor, so that only information of the internal bus access information, which has been thinned out selectively according to the operating frequency of the external bus, can be directly written into the trace memory.

In connection with such a high speed processor as well, there have been made proposals on configurations in, for example, Japanese Patent Laying-Open Nos. 2-310738 and 2-208785. A trace memory is incorporated in a processor in order to trace bus access information. In the configurations, after completion of tracing, bus access information is read out from the internal trace memory and debugging of a software or the like is executed.

In a case where a trace memory is incorporated in a processor as described above and such a processor is shipped as a product, the trace memory is delivered to a customer or the like staying within the processor. This trace memory is not used for actual data processing but exclusively for software debugging on the processor. Hence, there has arisen a problem of increase in cost of the processor since a chip area of this processor increases to accommodate the trace memory, which is used only in debugging of a program.

SUMMARY OF THE INVENTION

It is an object of the present invention to provide a processor with an internal bus debugging function whereby bus accesses in the processor operating at a high speed can be traced with ease without increase in chip area.

A processor with an internal bus tracing function according to the present invention includes: an internal bus including at least an internal data bus transferring internal data and an address bus transmitting an address signal; a first internal memory, coupled with the internal bus, for storing the internal data on the internal data bus; a processing unit, coupled with the internal bus, for processing at least data on the internal data bus; and a second internal memory, coupled with the internal bus, for storing information on the internal bus in a trace mode and for storing data that the processing unit uses in an operating mode other than the trace mode.

The first and second internal memories are provided in the processor and in the trace mode, the second internal memory is used as a trace memory storing access information on the internal bus, while in an operating mode other than the trace mode, the first and second internal memories are used as internal memories forming an address space accessible by the processor, with the result that a utilization efficiency of memories is improved and a constituent element unnecessary in an actual operation can be prevented from existing in the processor, which makes increase in chip size of the processor restricted.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
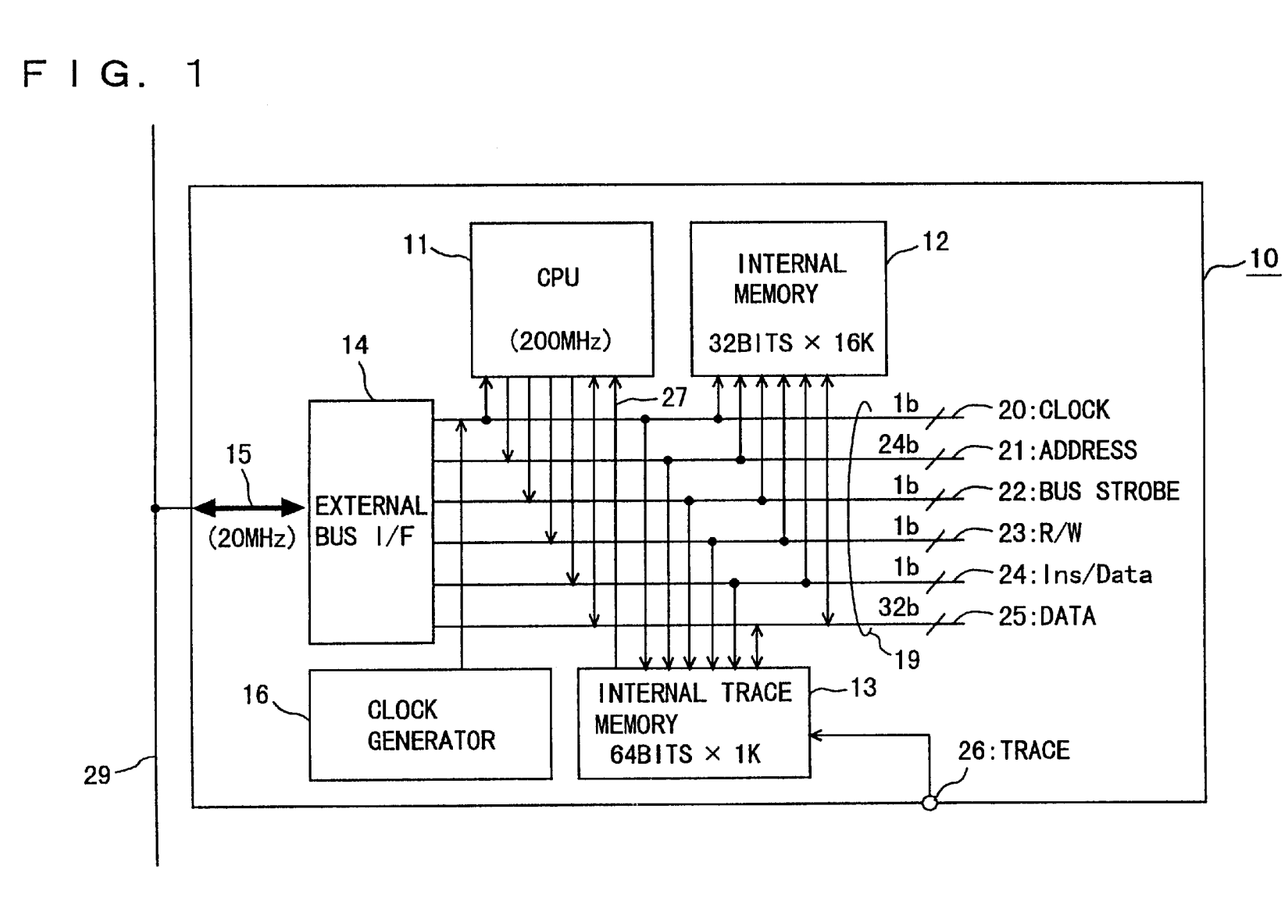
FIG. 1 is a schematic block diagram showing a configuration of the whole of a processor according to a first embodiment of the present invention.

FIG. 1 is a schematic block diagram showing a configuration of the whole of a processor with an internal bus tracing function according to a first embodiment of the present invention. In FIG. 1, a processor 10 includes: a central processing unit (CPU) 11 operable in synchronization with a clock signal of, e.g., 200 MHz; an internal memory 12 of CPU 11, with a memory capacity of 32 bits ·16K words, for storing an instruction and a data of 32 bits; an internal trace memory 13 storing, in a trace mode, information on an internal bus 19 and storing, in an operating mode other than the trace mode, an instruction or a data of 32 bits of CPU 11; a clock generator 16 generating a clock signal of 200 MHz that determines an operating speed of CPU 11; and an external bus interface (I/F) circuit 14 acting as an interface with an external unit.

The external bus interface (I/F) circuit 14 performs transmission/reception of data/signals 15 with an external bus 29 at a speed of, e.g., 20 MHz.

An internal bus 19 includes: a clock signal line 20 on which a clock signal from the clock generator 16 is transmitted; an internal address bus 21 on which address signals of 24 bits designating addresses for internal memory 12 and the internal trace memory 13 are transmitted; a bus strobe signal line 22 on which a bus strobe signal indicating whether or not there is existent a valid data or instruction on the internal bus, or whether or not internal memory 12, internal trace memory 13 or an external unit is accessed, is transmitted; a read/write signal line 23 on which a read/write designation signal R/W directing write or read of a data is transmitted; an instruction (Ins)/data (Data) identification signal line 24 on which an instruction (Ins)/data(Data) identification signal, directing whether accessed signal on the internal bus is an instruction or a data, is transmitted; and an internal data bus 25 on which an internal data of 32 bits is transmitted. The internal bus 19 is coupled with the external bus interface circuit 14, CPU 11, the internal memory 12 and the internal trace memory 13.

An operating mode of the internal trace memory 13 is determined according to a trace mode designation signal provided through a trace designation signal line 26 from the outside, for example, a tester. The internal trace memory has a memory capacity of 64 bits·1K, words. In the trace mode, the internal trace memory 13 stores information of 64 bits, while in an operating mode other than the trace mode, or in the read mode of trace results or in a normal operating mode, the internal trace memory 13 performs transmission/reception of data of 32 bits with the internal data bus 25. The internal trace memory 13 further generates a trace terminating designation signal if a predetermined condition is met in the trace operating mode to notify CPU 11 of completion of the tracing of internal bus access information through a signal line 27.

The internal trace memory 13 stores all information on the internal bus 19 with 60 bit width excluding a clock signal on the clock signal line 20 in the trace mode. That is, the internal trace memory 13 stores a total of 59-bit bus access information including an internal data of 32 bits, an internal address signal of 24 bits, a bus strobe signal of 1 bit, a read/write designation signal R/W of 1 bit, and an instruction/data identification signal Ins/Data of 1 bit.

Figure 2:
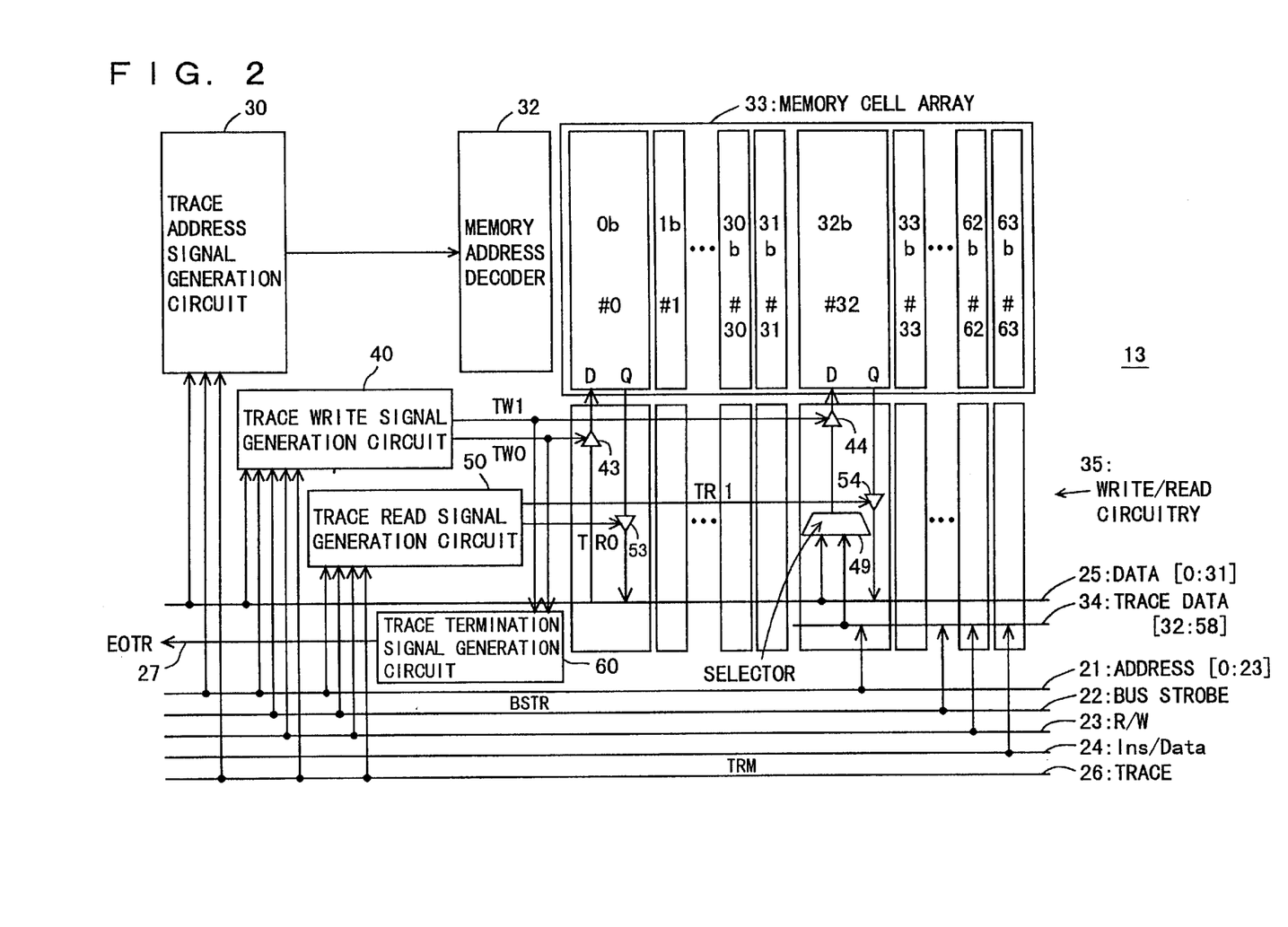
FIG. 2 is a schematic block diagram showing a configuration of an internal trace memory shown in FIG. 1.

FIG. 2 is a schematic block diagram showing a configuration of the internal trace memory 13 shown in FIG. 1. In FIG. 2, the internal trace memory 13 includes: a memory cell array 33 including IO blocks of 64 bits #0 to #63; a trace address signal generation circuit 30 receiving a trace mode designation signal TRM on a trace signal line 26, a 24 bit address [0:23] on an internal address bus 21 and an internal data [0:31] on an internal data bus 25, and generating, in the trace mode, an 8 byte boundary address according to an initial address provided to the internal data bus 25 and, in an operating mode other than the trace mode, an address signal according to an address [0:23] on the internal address bus 21; a memory address decoder 32 decoding an address signal from the trace address signal generation circuit 30, and selecting an addressed memory cell in the memory cell array 33; and a write/read circuitry 35 provided in correspondence to the IO blocks #0 to #63 of the memory cell array 33. A 1 bit memory cell is selected in each of the IO blocks #0 to #63 of the memory cell array 33 by the memory address decoder 32.

The internal trace memory 13 further includes: a trace write signal generation circuit 40 generating trace write enable signals TW0 and TW1 that control a write operation on an 10 block of the memory cell array 33 according to a trace mode designation signal TRM, a read/write designation signal R/W, an internal address [0:23] and an internal data [0:31]; and a trace read signal generation circuit 50 generating trace read signals TR0 and TR1 that control a read operation on a memory cell data from IO blocks of 32 bits among the IO blocks of 64 bits of the memory cell array 33 according to the 24 bit address [0:23] on the address bus 21, a bus strobe signal BSTR on the bus strobe signal line 22 and a read/write designation signal R/W.

The trace write enable signal TW0 from the trace write signal generation circuit 40 enables a write operation on the IO blocks #0 to #31 of the memory cell array 33 when activated. The trace write enable signal TW1 enables a write operation of data on the IO blocks #32 to #63 when activated. The trace write enable signal TW0 is given to a write drive circuit 43 provided to the write/read circuitry for the IO blocks #0 to #31 while the trace write enable signal TW1 is applied to a write drive circuit 44 for the write/read circuitry 35 provided to the IO blocks #32 to #63. The write drive circuits 43 and 44 are activated in activation of the trace write enable signals TW0 and TW1 and data (information) is transmitted to corresponding IO blocks according to a supplied internal write data.

A read amplifier 53 provided for each of the IO blocks #0 to #31 receives the trace read enable signal TR0 from the trace read signal generation circuit 50. On the other hand, a read amplifier 54 included in the write/read circuitry 35 provided for each of the IO blocks #32 to #63 receives the trace read enable signal TR1. In the write/read circuitry 35 provided for the IO blocks #32 to #63, there is provided, for each of the IO blocks, a selector 49 selecting one of a corresponding bit on the internal data bus 25 and a corresponding bit on the trace data bus 34 according to the trace mode designation signal TRM. An output signal (data) of the selector 49 is applied to the corresponding write drive circuit 44. Further, the IO blocks #0 to #31 supply or receive data bits to or from the internal data bus 25 in the trace mode or the other operating modes when selected. On the other hand, for the IO blocks #32 to #63, the selectors 49 select information bits on the trace data bus 34 in the trace mode, while the selectors 49 select data bits on the internal data bus 25 in the other operating modes. Therefore, the IO blocks #32 to # 63 store information bits on the trace data bus 34 in the trace mode while the IO blocks #32 to #63 store information bits on the internal data bus 25 in the other operating modes.

In the read operation mode, the trace information is necessary to transfer to an external unit through the internal data bus 25, and the read amplifiers 53 and 54 included in the write/read circuitry 35 transmit corresponding data bits onto the internal data bus 25 when activated.

An address [0:23] on the internal address bus 21, a bus strobe signal BSTR, a read/write designation signal R/W, and an instruction/data identification signal Ins/Data are applied onto the trace data bus 34. Therefore, the trace data bus 34 receives signals of 27 bits. The corresponding IO blocks #32 to #63 are of 32 bits and the IO block of 5 bits are retained as reserve for a case where access information to be traced increases in bit.

The internal trace memory 13 further includes a trace termination signal generation circuit 60 that issues a trace termination designation signal EOTR to CPU 11 through a signal line 27 when a predetermined condition is met according to the trace write enable signals TW0 and TW1 from the trace write signal generation circuit 40. An operation to detect trace termination of the trace termination signal generation circuit 60 will be detailed later; when bus access information is stored a certain number of times, the trace termination designation signal EOTR is activated.

Now, description will be made of write and read operations of internal bus access information (trace information) on the internal trace memory 13.

CPU 11 reads out an instruction stored in the internal memory 12 through the internal bus 19 and executes an instruction read out therefrom. When a data necessary for execution of the instruction is stored in the internal memory 12, CPU 11 reads again a data stored in the internal memory 12 through the internal bus 19. Further, when a data corresponding to a processing result after execution of the instruction is stored in the internal memory 12, the processing result data is stored into the internal memory 12 through the internal bus 19. Therefore, information about transfer of instructions and data on the internal bus 19 is important for the purpose to know how CPU 11 has been operated. When a program of CPU 11 is developed or debugged, development and debugging of the program can be made more efficient by utilizing such information transferred through the internal bus 19.

When the trace mode is set, the trace mode designation signal TRM on the trace signal line 26 shown in FIG. 1 is set to "1" in the active state. When the trace mode designation signal TRM comes into the activation state, the trace address signal generation circuit 30, the trace write signal generation circuit 40 and the trace read signal generation circuit 50 come into the trace mode and information on the internal bus 19 is stored into the memory cell array 33 when the bus strobe signal BSTR on the bus strobe signal line 22 is activated. That is, as shown in FIG. 2, the address [0:23] on the address bus 21, the bus strobe signal BSTR on the bus strobe signal line 22, the read/write designation signal R/W and the instruction/data identification signal Ins/Data are stored into the trace memory 13 together with the internal data [0:31] on the internal data bus 25.

In the memory cell array 33, the 32 bit data [0:31] on the internal data bus 25 is stored into the IO blocks #0 to #31. The other access control information is written into the IO blocks #32 to #58 through the trace data bus 34 and through the selectors 49. Internal bus access information is of a total of 59 bits including the 32 bit internal data, and the bus access control information is written into the IO blocks #32 to #58. CPU 11 operates according to a clock signal of 200 MHz and transfers information on the internal bus 19 and also writes the internal bus access information into the internal trace memory 13 at an operating speed of 200 MHz in synchronization with an internal clock signal from the clock generator 16.

A write mode for writing access information on the internal bus 19 into the internal trace memory 13 can be selected from three kinds of write modes: first, when the internal bus 19 is accessed (when the bus strobe signal is activated), all access information on the internal bus 19 is stored into the internal trace memory 13; second, access information, on the internal bus 19, for a designated address region in an address space of CPU 11 is stored into the internal trace memory 13; and, third, access information on the internal bus 19 for internal bus accesses by a predetermined number of times after accessing to a certain address is written into the internal trace memory 13. Control of write of the internal bus access information (trace information) is performed such that the internal bus access information is stored into the internal trace memory 13 when a condition set according to an operating mode under control of the trace write signal generation circuit 40 shown in FIG. 2 is established.

A termination condition of write of information on the internal bus 19 into the internal trace memory 13 is any of the following conditions: first, when the number of write operations on the internal trace memory 13 reaches a preset number of times, a write operation of information on the internal bus 19 on the internal trace memory 13 is terminated; and second, when the trace mode is terminated, that is, when a trace mode designation signal TRM on the trace signal line 26 is changed from "1" to "0", a write operation of information transmitted through the internal bus 19 into the internal trace memory 13 is terminated. Detection and control of the termination of a write operation on the internal trace memory 13 are performed by the trace termination signal generation circuit 60. The trace termination signal generation circuit 60 signals CPU 11 of completion of the write operation of the internal bus access information, activating a trace mode termination designation signal EOTR when any of the conditions is established.

CPU 11 terminates access to the internal bus 19 according to the trace mode termination designation signal EOTR received through the signal line 27 and/or sends notification on completion of the write operation of the internal bus access information on the internal trace memory 13 onto the external bus 29 through the external bus interface circuit (I/F) 14. A tester or a debug unit provided outside sets the trace mode designation signal TRM to "0" (when the write operation described above is terminated under the first condition).

When the write operation of the internal bus access information on the internal trace memory 13 is terminated, the trace mode designation signal TRM on the trace mode signal line 26 is set to "0" and an operation in the normal mode runs. In a case where internal bus access information stored in the internal trace memory 13 is read according to the normal operating mode, the external tester or debug unit accesses the internal trace memory 13 through the external bus 29 and through the external bus interface circuit (I/F) 14 and reads out the internal bus access information stored in the internal trace memory 13. The external bus interface circuit (I/F) 14 is herein assumed to operate at an operating frequency of 20 MHz, lower than an operating frequency (200 MHz) of CPU 11. Therefore, high speed bus access information in the CPU 11 can all be read out through the external bus interface circuit (I/F) 14 operating at a low speed.

The internal trace memory 13 has IO bits of 64 bits and the bit width is a natural number times (twice) the bit width of 32 bits of the internal data bus 25. Therefore, an access to the internal trace memory 13 can be performed in a unit of 32 bits with ease, wherein addressing is performed dividing the IO blocks into groups for the upper 32 bits and the lower 32 bits, and the internal trace memory 13 can be used as an internal memory in the normal operating mode.

Further, in a read operation of trace information (internal bus access information) as well, read of information is performed in a unit of 32 bits. Therefore, with the use of the internal data bus 25, internal bus access information with a bit width broader than a bit width of the internal data bus 25 can be read out onto the external bus 29 through the internal data bus 25. It should be appreciated that the number of IO blocks is only required to be a value of natural number times a bit width of the internal data bus. Then, description will be made of a particular operation of the processor 10 with the internal bus tracing function and of structures of constituents thereof.

Figure 3:
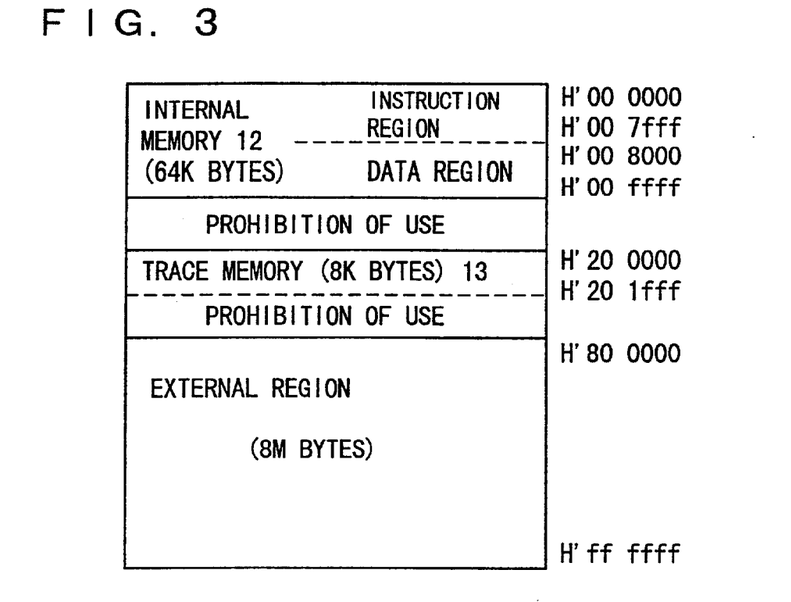
FIG. 3 is a schematic illustration showing address assignment of the processor according to the first embodiment of the present invention.

FIG. 3 is a schematic illustration showing an example of a memory map of the processor 10 with the internal bus tracing function according to the present invention. In FIG. 3, the internal memory 12 has a memory capacity of 64 K bytes. The internal memory 12 is allocated with address regions H'000000 to H'00ffff. Of the address regions, the address region from H'000000 to H'007fff are used as an instruction region in which instructions are stored. Address regions from H'008000 to H00fff are used as a region to store data. Here, [H'] indicates a number in the hexadecimal notation.

The internal trace memory 13 is allocated with address region from H'200000 to H'201fff. The internal trace memory 13 has a memory capacity of 8 K bytes.

The external memory unit (a disk memory unit, DRAM (dynamic random access memory), a flash memory and so on) is allocated with an address region from H'800000 to H'ffffff. This external region has a memory capacity of 8 M bytes. Address regions H'00ffff to H'1fffff and H202000 to H'7fffff are regions under prohibition on use.

The internal memory 12 receives an address of a 4 byte boundary (in unit of 32 bits) since address assignment for the external memory unit is performed in unit of bytes. The internal trace memory 13 receives an address with an 8 byte boundary since internal bus access information of 64 bits is stored in the trace mode. In the normal operating mode other than the trace mode, the internal trace memory 13 is supplied with an address of a 4 byte boundary. Here, an address of a 4 byte boundary is used for a case where the address is assigned in unit of 4 bytes and an address of an 8 byte boundary is used for a case where the address is updated in a unit of 8 bytes.

Figure 4:
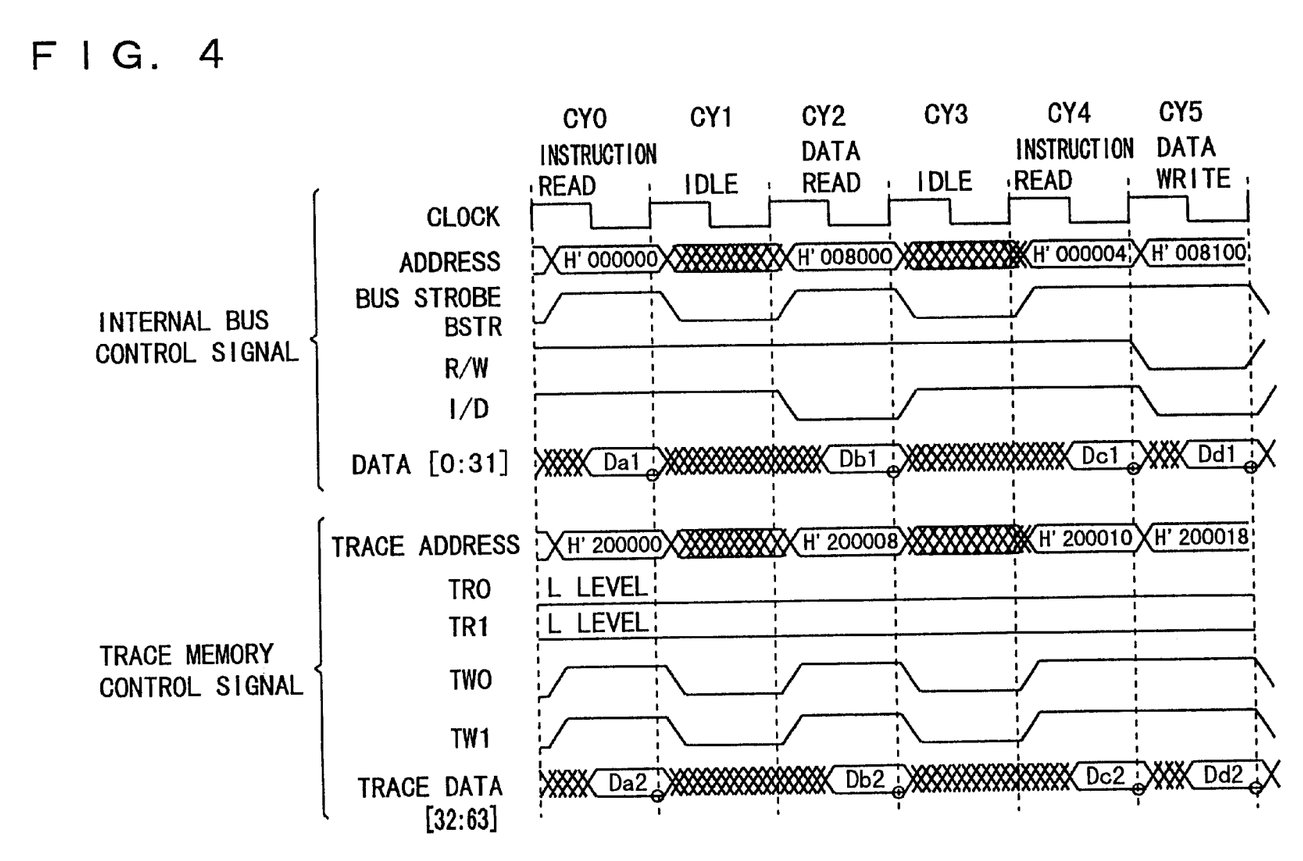
FIG. 4 is a timing chart representing operations of the processor according to the first embodiment of the present invention.

FIG. 4 is a timing chart showing states of a signal/data on the internal bus and a control signal in the internal trace memory in the trace mode. Particular description will be given of an operation of storing internal bus access information in the trace mode with reference to FIGS. 2 to 4.

In a cycle CY0, CPU 11 executes an instruction read on the internal memory 12. At this time, an address H'000000 is sent onto the internal address bus 21. Further, the bus strobe signal BSTR comes into an activation state at H level since a valid signal is output onto the internal bus 19. The read/write designation signal RJW is set to a read designation state at H level because of the instruction read. Further, the instruction/data identification signal I/D (Ins/Data) is retained at H level ("1") because of the instruction read. In the cycle CY0, an instruction Da1 accessed is read out onto the internal data bus 25. On the other hand, in the internal trace memory 13, the trace address signal generation circuit 30 generates an address H'200000. In the trace mode, the trace read enable signals TR0 and TR1 are both retained at L levels ("0") since only a write operation of internal access information is performed on the internal trace memory 13. When a bus strobe signal BSTR is activated, trace write enable signals TW0 and TW1 from the trace write signal generation circuit 40 shown in FIG. 2 are activated. With the activation, a data Da1 read onto the internal data bus and trace data (an address, a bus strobe, a read/write designation signal and an instruction/data identification signal) Da2 read onto the trace data bus 34 are stored into the internal trace memory 13.

In the next cycle CY1, CPU 11 executes an instruction that has been read, and the internal bus is in the idle state. Therefore, the bus strobe signal BSTR is at L level in the non-activation state.

In a cycle CY2, CPU 11 again executes a data read operation on the internal memory 12. An address at this time is an address H'008000 and the data Db1 of 32 bits at this address is read onto the internal data bus 25. On the other hand, in the trace memory 13, the trace address signal generation circuit 30 again generates an address H'200008 in response to activation of the bus strobe signal BSTR, further, the trace write enable signals TW0 and TW1 are activated by the trace write signal generation circuit 40 and the data Db1 and Db2 of 64 bits are stored into the trace memory 13.

A cycle CY3 is an idle cycle, the bus strobe signal BSTR is at L level and in response to this, the trace write enable signals TW0 and TW1 also come into the non-activation state at L level.

In a cycle CY4, an instruction read operation is executed in which an address H'000004 of the internal memory 12 is read out. The instruction/data identification signal I/D (Ins/Data) is retained at H level in order to read the instruction. In the instruction read cycle, an instruction Dc1 of 32 bits is read from the internal memory 12.

On the other hand, since 8 byte information is stored in advance in the internal trace memory 13, an address is incremented by 8 and an address H'200010 is generated as a trace address. In response to activation of the trace write enable signals TW0 and TW1 following activation of the bus strobe signal BSTR, the instruction Dc1 on the internal data bus, the internal memory address H'000004 on the address bus, the read/write designation signal R/W, the instruction/data identification signal I/D and the bus strobe signal BSTR are written into the internal trace memory 13.

In a cycle CY5, an address H'008100 is sent out onto the internal address bus, further, the read/write instruction signal R/W is set to L level and data write is designated. Because of the data write, the instruction/data identification signal I/D is set to L level which indicates data. Further, in the cycle CY5, the bus strobe signal BSTR maintains the activation state at H level since valid data is output onto the internal data bus. Therefore, data Dd1 of 32 bits on the internal data bus is written into the internal memory 12 at an address H'008100.

In the cycle CY5, since the bus strobe signal BSTR is in the activation state at H level, the trace write enable signals TW0 and TW1 maintain the activation state at H level and a write operation of internal bus access information to the internal trace memory 13 is permitted in parallel with a write operation of the data Dd1 for the internal memory 12. A trace address is incremented by 8 to be H'200018 and trace data Dd2 including the data Dd1 on the internal data bus, the address H008100 on the internal address bus, the bus strobe signal BSTR, the read/write designation signal RJV and the instruction/data identification signal I/D are written at the address H'2000018. The trace information is written into the IO blocks #0 to #58 (the trace information is written into the IO blocks #32 to #58 and a data of 32 bits on the internal data bus is written into the IO blocks #0 to #31).

As shown in FIG. 4, internal bus access information is stored into the internal trace memory 13 at positions of bits 0 to 58 thereof in parallel to the internal bus access according to activation of the bus strobe signal BSTR. In the trace mode, a trace address is updated in a unit of 8 bytes, an operation is performed at the same operating speed (200 MHz) as that of the internal memory 12 and the internal bus access information in respective internal bus access cycles is stored with certainty.

Figure 5:
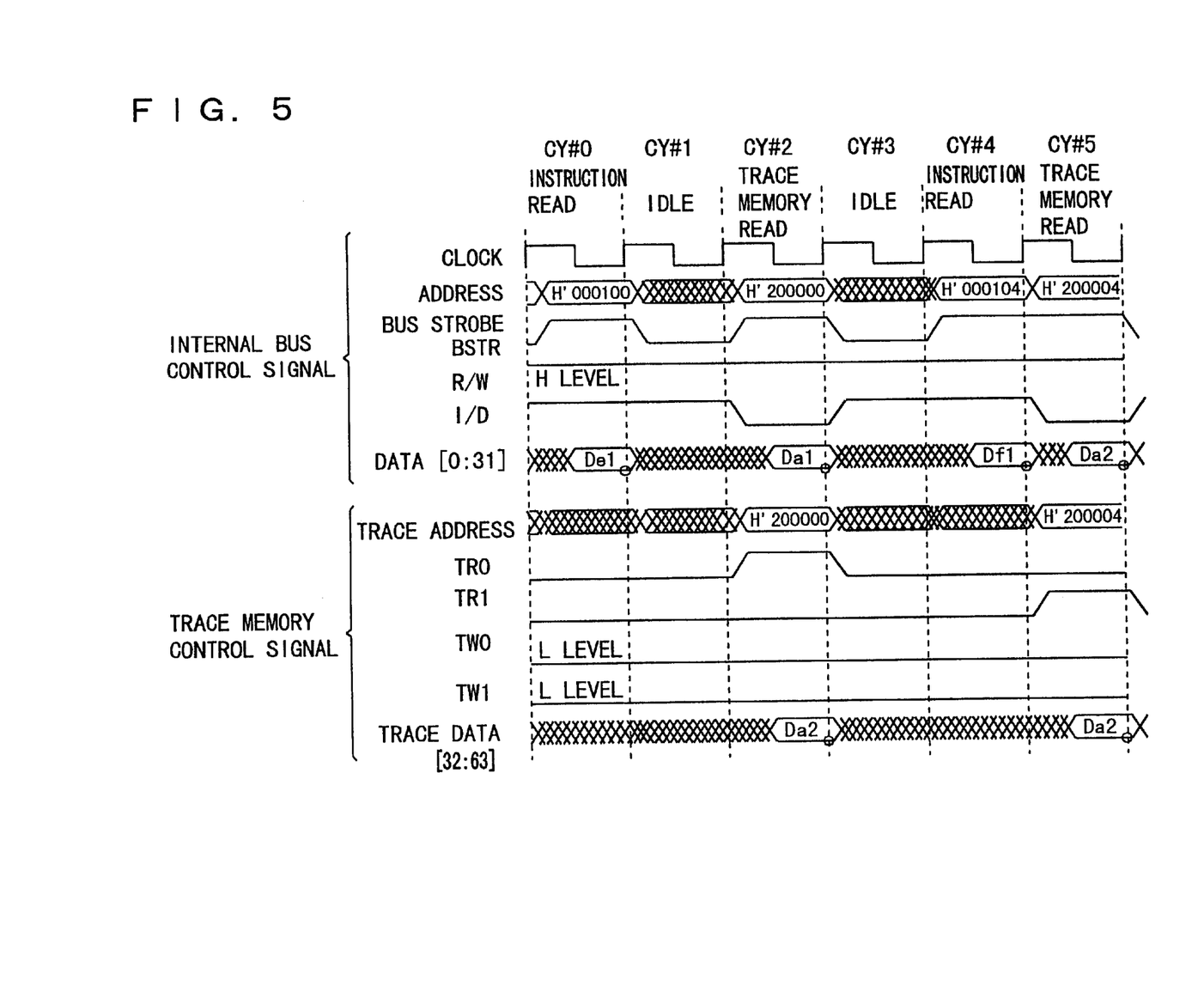
FIG. 5 is a timing chart representing operations in a normal operating mode of the processor according to the first embodiment of the present invention.

FIG. 5 is a timing chart showing states of signals in the normal mode. In the normal mode, the trace mode indication signal TRM is set to L level ("0").

In a clock cycle CY#0, an instruction read operation is directed. At this time, the read/write designation signal R/W is set to the data read state at H level and further the instruction/data identification signal I/D is also set to H level. As for an address, instruction read is to be executed and an address H'000100 in the instruction region is designated. In the internal trace memory 13, since the address H'000100 resides in an address region different from one allocated to the trace memory in the normal mode, access is not made to the address and all of the enable signals TR0, TR1, TW0 and TW1 are set to L level. In this state, data (instruction) De1 of 32 bits is read out onto the internal bus from the internal memory 12.

The next cycle CY#1 is an idle cycle and transfer of data/instruction on the internal data bus is not performed.

In a clock cycle CY#2, an address H'200000 is designated and further, the bus strobe signal BSTR is activated. The instruction/data identification signal I/D is set to L level and a data read operation is designated. At this time, the read/write designation signal R/W is at H level. The address H'200000 is an address assigned to the trace memory 13 and 64 bit data at the address is selected. In the normal mode, however, since 32 bit data is read out from the internal trace memory, addresses of the trace memory are all at 4 byte boundary. This address assignment will be described later. When the lower 4 bits are H'0 and H'8, the IO blocks #0 to #31 shown in FIG. 2 are accessed, while when the lower 4 bits are H'4 and H' C, the IO blocks #32 to #63 shown in FIG. 2 are accessed. Therefore, one of the trace read enable signals TR0 and TR1 is activated according to the value of the lower 4 bits. This is true for the trace write enable signals TW0 and TW1. Therefore, in the cycle CY#2, the 32 bit data Da1 out of the data Da1 and Da2 of 64 bits selected on the trace memory 13 is read out onto the internal data bus.

A cycle CY#3 is an idle cycle and the bus strobe signal BSTR is in the non-activation state at L level and no transfer operation on the internal bus is performed.

In a cycle CY#4, an address H'000104 is designated and the instruction/data identification signal I/D is set to H level (in the idle cycle, here, the instruction/data identification signal I/D is set to H level). Therefore, in the cycle CY#4, an instruction Df1 of 32 bits at the address H'000104 is read out on the internal data bus from the internal memory 12.

In a cycle CY#5, an address H'200004 is designated, further, the read/write designation signal R/W is set to a data read state at H level and the instruction/data identification signal I/D is set to L level which indicates data access. In this case, therefore, in the trace memory 13, the data Da2 (stored in the IO blocks #33 to #63) of 32 bits out of the data (Da1 and Da2) of 64 bits selected at the address H'200004 is read out onto the internal data bus. The lower 4 bits of the address H'200004 is H'4 and the trace read enable signal TR1 is activated.

As described above, in the normal mode, an address of a 4 byte boundary is applied to the trace memory, while in the trace mode, an address of an 8 byte boundary is applied to the trace memory and thereby, in the trace mode, internal bus access information of a 64 bit width is stored, while in the normal mode, access of 32 bit data can be performed through the internal data bus. Therefore, the trace memory can be used as an internal memory in the normal mode and components in a processor can be efficiently and effectively used, thereby, enabling increase in chip area to be otherwise caused by an unnecessary element to be suppressed.

It should be appreciated that trace memory read cycles are executed (either an external tester or a debug unit may directly access, or a read access may be performed under control of CPU 11), as in the timing chart shown FIG. 5, in a case where internal bus access information stored in the trace mode is read out for the purpose of debugging as well. A trace memory address is updated in a unit of 4 bytes and thereby, data on the internal data bus and address information on the trace data bus in a linked state can be received as internal data bus access information by an external unit (internal bus access information can be obtained in one clock cycle of the inside of the processor by linking data read in consecutive two cycles with each other). It should be appreciated that a bus width of the external bus 29 shown in FIG. 1 may be any and the external bus interface circuit (I/F) 14 may adjust bus widths of the internal data bus and the external data bus therebetween. Therefore, there is no special requirement that the internal data bus 25 and the external data bus included in the external bus 29 should be equal to each other in bit width.

The following should be appreciated. In FIG. 5, a data write cycle for the trace memory is not shown. However, in the trace memory read cycles CY#2 and CY#5, when the read/write designation signal R/W is set to L level to designate data write, the trace write enable signals TW0 and TW1 are selectively activated according to addresses, 32 bit data on the internal data bus are written into the trace memory IO blocks #0 to #31 and #32 to #63, respectively, (in respective cycles CY#2 and CY#5).

Then, description will be made of configurations of the constituents.

[Constitution of Trace Address Signal Generation Circuit]

Figure 6:
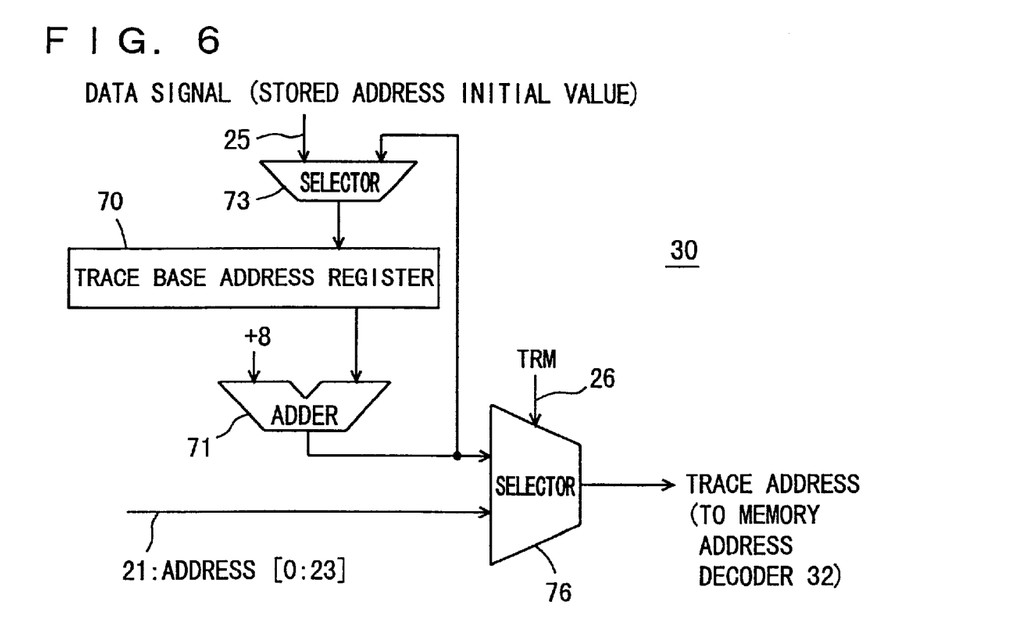
FIG. 6 is a schematic block diagram showing a configuration of a trace address signal generation circuit shown in FIG. 2.

FIG. 6 is a schematic block diagram showing a configuration of the trace address signal generation circuit 30 shown in FIG. 2. In FIG. 6, the trace address signal generation circuit 30 includes: a trace base address register 70 storing a trace base address; an adder 71 adding +8 to a trace base address output by the trace base address register 70; a selector 76 generating a trace address by selecting one of an address output by the adder 71 and an address [0:23] on the address bus 21 according to the trace mode designation signal TRM; and a selector 73 selecting one of the address output by the adder 71 and a storing address initial value applied through the internal data bus 25 in an initial setting to the trace base address register 70. The trace base address register 70, for example, outputs a stored address in synchronization with rise of an internal clock signal and further, stores an address received from the selector 73 at the timing of fall of the clock signal when the bus strobe signal BSTR is in the activation state at H level.

Figure 7:
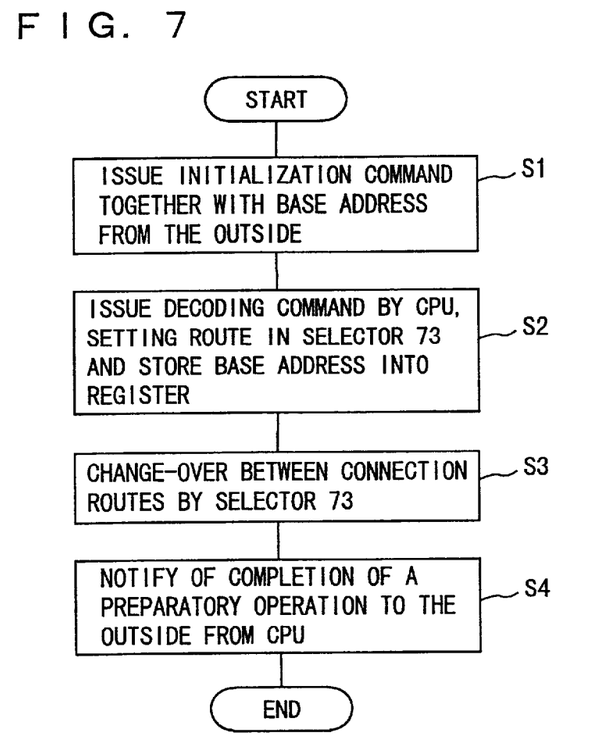
FIG. 7 is a flow chart representing an operation of the trace address signal generation circuit shown in FIG. 6.

FIG. 7 is a flow chart representing an initial address setting operation on the trace address signal generation circuit 30. Description will be made of the initial address setting operation on the trace base address register 70 below with reference to FIGS. 6 and 7.

First, an initialization command is issued together with a base address from the tester or the debug unit in the outside, to be supplied to CPU 11 (step S1). The base address is applied to CPU 11 through the interface circuit (I/F) 14, and CPU 11 decodes the initialization command, sets a connection path of the selector 73 so as to select the internal data bus 25 and sets the trace base address register 70 so as to store an output of the selector 73 (step S2). In the setting of the route of the selector 73 by CPU 11, the applied base address is again output to the internal data bus. At this time, the bus strobe signal BSTR is fixed at L level in the non-activation state and a base address storing operation on the internal memories 12 and 13 is prohibited. Further, alternatively, an address of a use-prohibited address region shown in FIG. 3 may be issued concurrently with activation of the bus strobe signal BSTR.

Thereafter, when storage of an initial value into the trace base address register 70 is completed, CPU sets the selector 73 so as to select an output address of the adder 71 (step S3). After switching between connection routes via the selector 73 is performed, CPU notifies the tester or the debug unit in the outside of completion of the initialization, that is, completion of a preparatory operation for the trace mode (step S4).

It should be appreciated that the initialization may be executed directly by the tester or the debug unit in the outside instead of the control performed by CPU11.

Figure 8:
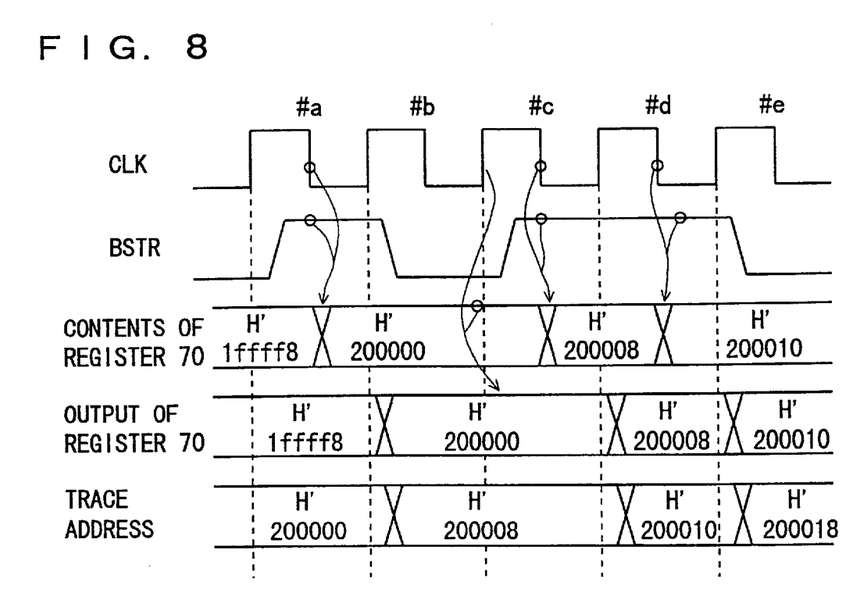
FIG. 8 is a timing chart representing operations of the trace address signal generation circuit shown in FIG. 6.

FIG. 8 is a timing chart representing operations of the trace address signal generation circuit 30 shown in FIG. 6.

In a clock cycle #a, an initial value 1ffff8 (H) is stored into the register 70. The stored contents of the register 70 is output from the register 70 as an initial address 1ffff8 (in the hexadecimal notation) in response to rise in a clock signal CLK. The address output from the register 70 is added with 8 by the adder 71, the selector 76 selects an output address of the adder 71 in the trace mode according to the trace mode designation signal TMR and the trace address comes to be H'200000. In the cycle #a, when the bus strobe signal BSTR is at H level, the trace base address register 70 stores the address H'200000 received through the selector 73 in synchronization with fall of the clock signal CLK. The clock signal CLK is at L level and an output address of the register 70 does not change.

In a clock cycle #b, when the clock CLK signal rises, an output address of the register 70 changes to H'200000. In the cycle #b, the bus strobe signal BSTR is at L level and the contents of the register 70 are not updated. Therefore, in the clock cycle #b, a trace address is added with 8 by the adder 71 to be H'200008.

In a clock cycle #c, the bus strobe signal BSTR again comes into the activation state at H level and an internal bus access is executed. Therefore, at this time, bus information is stored into the trace memory according to the trace address H'200008. When the clock signal CLK falls to L level in the clock cycle #c, the trace address is stored into the trace base address register 70 and a stored address of the register 70 is updated to H'200008.

Since an output value of the register 70 is updated in synchronization with of the clock signal CLK in a clock cycle #d and then the adder 71 executes addition of +8, a trace address in the clock cycle #d comes to be H'200010. Since the bus strobe signal BSTR is at H level in the clock cycle #d, the trace base address register 70 takes in and stores the trace address H'200010 received through the selector 73. Then, in a clock cycle #e, an output address of the trace base address register 70 is updated in response to rise in the clock signal CLK and at this time, a trace address comes to be H'200018. In the clock cycle #e, the bus strobe signal BSTR is in the non-activation state at L level, the cycle #e is an idle cycle and the contents of the trace base address register 70 is not updated.

With such a procedure, when a bus access is made, address updating is performed with certainty and a trace memory address for the next internal bus access can be generated.

In the normal mode, where the trace mode designation signal TRM is at L level ("0"), the selector 76 selects an address [0:23] on the address bus 21, generates a trace memory address for application to the memory address decoder 32.

[Modification]

Figure 9:
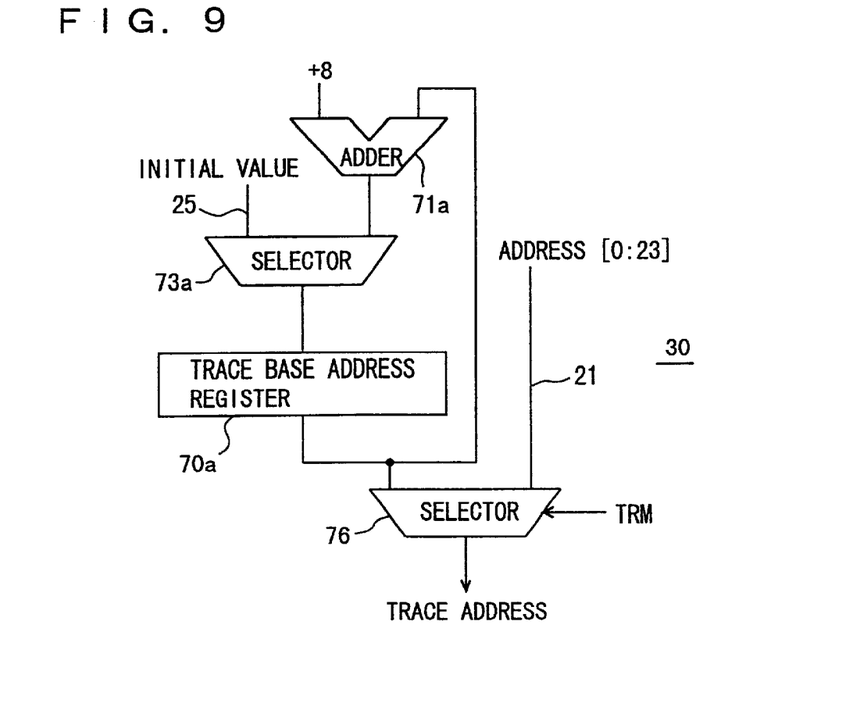
FIG. 9 is a block diagram showing a modification of the trace address signal generation circuit shown in FIG. 2.

FIG. 9 is a schematic block diagram showing a modification of the trace address signal generation circuit 30. In FIG. 9, the trace address signal generation circuit 30 includes: a trace base address register 70a storing an initial value of an address region that stores trace information (internal bus access information) under control of CPU or the external tester; an adder 71a adding +8 to an output address of the trace base address register 70a; and a selector 73a selecting one of an initial value on the internal data bus 25 and an output of the adder 71a under control of CPU or the external tester. An output value of the selector 73a is applied to the trace base address register 70a.

The trace address signal generation circuit 30 further includes: a selector 76 selecting one of an output address of the trace base address register 70a and an address [0:23] on the internal address bus 21 according to the trace mode designation signal TRM to generate a trace address.

The trace base address register 70a stores an initial address provided through the selector 73a under control of CPU or the external tester in initialization, similar to the case of the trace base address register 70 shown in FIG. 6. In the trace mode, the trace base address register 70a stores an address provided through the selector 73a at fall of the clock signal CLK when the bus strobe signal is at H level. Further, the trace base address register 70a outputs the stored address in response to rise of the clock signal CLK.

Figure 10:
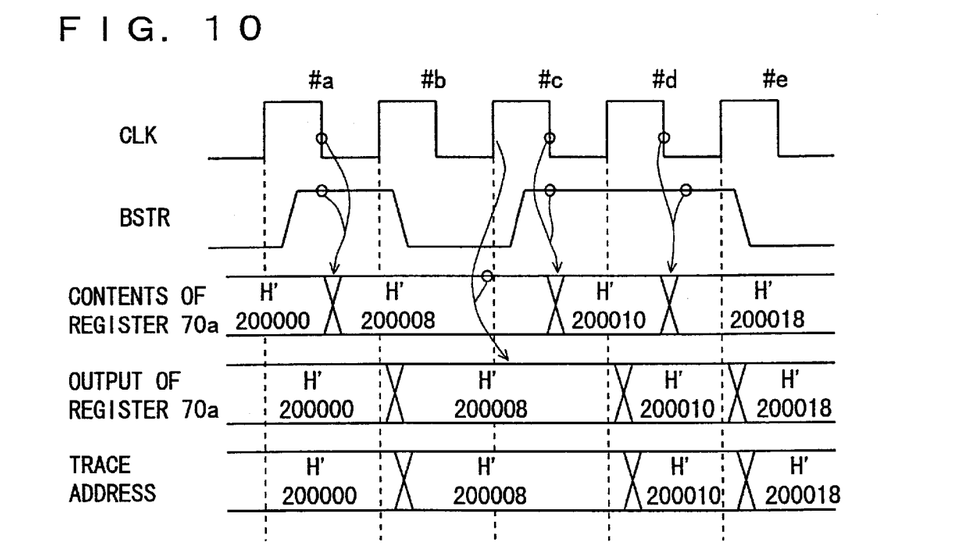
FIG. 10 is a timing chart representing operations of the trace address signal generation circuit shown in FIG. 9.

Therefore, in the configuration of the trace address signal generation circuit 30 shown in FIG. 9, an initial address H'2000000 of the internal trace memory can be stored as an initial value into the trace base address register 70a and there is no need of setting an initial address taking an addition of +8 at the adder 71a into consideration, thereby making an initial address setting operation easy, as shown in FIG. 10. In the trace mode, the selector 73a selects an output address of the adder 71a under control of CPU or the external tester after completion of the initial address setting operation. Therefore, contents of the trace base address register 70a are updated each time the bus strobe signal BSTR is activated and, in the trace mode, the trace memory address is updated in a unit of 8 bytes, similar to in the configuration shown in FIG. 6.

[Configuration of Trace Write Signal Generation Circuit]

Figure 11:
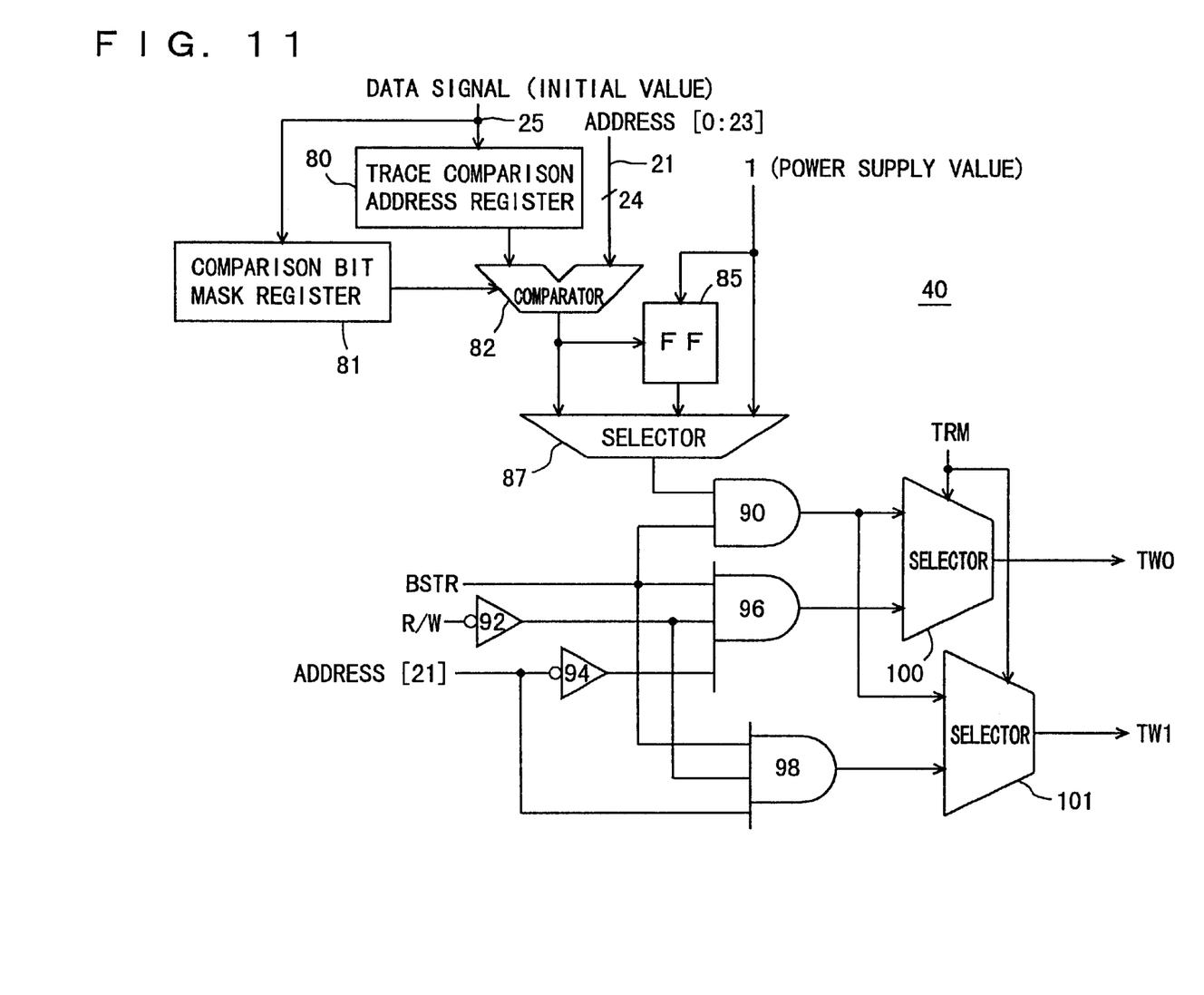
FIG. 11 is a block diagram showing a configuration of the trace write signal generation circuit shown in FIG. 2.

FIG. 11 is a schematic block diagram showing a configuration of the trace write signal generation circuit 40 shown in FIG. 2. In FIG. 11, the trace write signal generation circuit 40 includes: a trace comparison address register 80 storing a trace comparison address designating an address region to be traced; a comparison bit mask register 81 storing a comparison bit designating a bit position to be compared of the trace comparison address; a comparator 82 comparing the trace comparison address from the trace comparison address register 80 with an address [0:23] on the internal address bus 21 under control of the comparison bit mask register 81; a flip-flop (FF) 85 set when an output signal of the comparator 82 indicates coincidence of the addresses; and a selector 87 selecting one of output signals of the comparator 82 and the flip-flop 85, and of a fixed value (a signal at a power supply voltage level) "1". With this selector 87, operations in the following three write modes, in regard to internal bus access information to be written into the internal trace memory in the trace mode, can be realized: (1) a write operation is performed only in access to a designated address region, (2) a writing of all internal bus access information into the trace memory is performed after access to a certain address, and (3) all internal bus access information is written into the internal trace memory.

The trace write signal generation circuit 40 further includes: an AND circuit 90 receiving an output signal of the selector 87 and the bus strobe signal BSTR; an inverter 92 receiving the read/write designation signal R/W; an inverter 94 receiving the address bit [21]; an AND circuit 96 receiving the bus strobe signal BSTR and output signals of the inverters 92 and 94; an AND circuit 98 receiving the bus strobe signal BSTR, the output signal of the inverter 92 and the address bit [21]; a selector 100 outputting the trace write enable signal TW0 by selecting one of output signals of the AND circuits 90 and 96 according to the trace mode designation signal TRM; and a selector 101 outputting the trace write enable signal TW1 by selecting one of outputs of the AND circuits 90 and 98 according to the trace mode designation signal TRM. By the use of the address bit [21], it is determined whether or not an internal address is an address at a 4 byte boundary (which will be detailed later). Now, descriptions will be made of operations of the components.

Figure 12A:
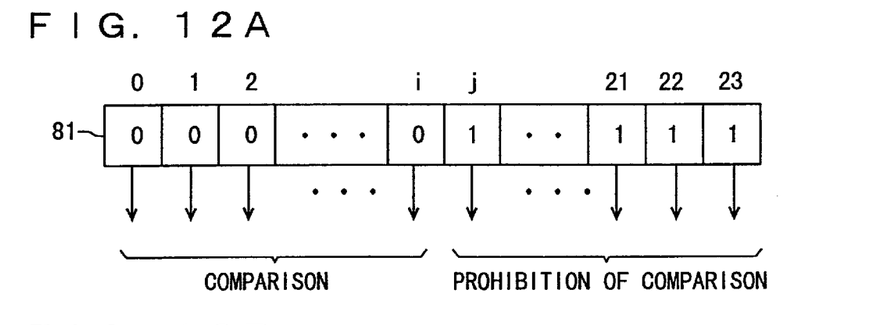
FIG. 12A is a schematic illustration showing a structure of a comparison bit mask register shown in FIG. 11
Figure 12B:
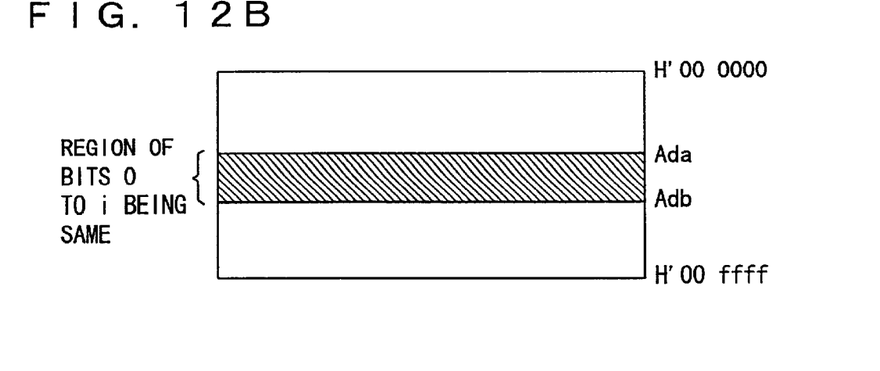
FIG. 12B is a schematic illustration showing a detected address region of the comparison bit mask register shown in FIG. 12A.

FIG. 12A is a schematic illustration showing a structure of a comparison bit mask register 81 shown in FIG. 11. The comparison bit mask register 81 includes register circuits of 24 bits corresponding to an address of 24 bits. A mask bit "0" (L level) or "1" (H level) is stored in each of the register circuits of 24 bits. An address bit corresponding to the register circuit in which a bit "0" is stored is subjected to comparison in the comparator 82. On the other hand, comparison of an address bit corresponding to a register circuit in which a bit "1" is stored is prohibited (masked). Therefore, as shown in FIG. 12B, when an address in a region between addresses Ada and Adb is designated in the address region from H'000000 to H'00ffff of the internal memory, a signal indicating coincidence is output from the comparator 82. The region between the addresses Ada and Adb is determined by bits [0:i] of a trace comparison address to be stored in the trace comparison address register 80. Therefore, only internal access information in the consecutive address region can be stored into the internal trace memory. With the use of the comparison bit mask register 81, only information on the internal bus relating to internal access in the designated address region can be written into the internal trace memory.

The flip-flop 85 takes in the power supply value "1" to output it if an output signal of the comparator 82 indicates coincidence. In this case, when a trace comparison address that has been stored in the trace comparison address register 80 is accessed in a state where comparison of all bits is directed in the comparison bit mask register 81 (when "0" is written in all bits), all of information on internal access thereafter can be written into the internal trace memory.

In a case where the selector 87 selects the power supply value "1", information on all internal accesses is written into the internal trace memory.

The selectors 100 and 101 select an output signal of the AND circuit 90 according to the trace mode enable signal TRM in the trace mode. Therefore, the trace write enable signals TW0 and TW1 are activated according to an output signal from the selector 87 each time the bus strobe signal BSTR is activated. With this activation of the trace write enable signals TW0 and TW1, internal bus information relating to internal access can be written into the trace memory according to either one selected from the three write modes of write operations.

When the trace mode designation signal TRM comes into the non-activation state, the selectors 100 and 101 select output signals of the AND circuits 96 and 98. In the normal mode, an address is generated at a 4 byte boundary.

Figure 13A:
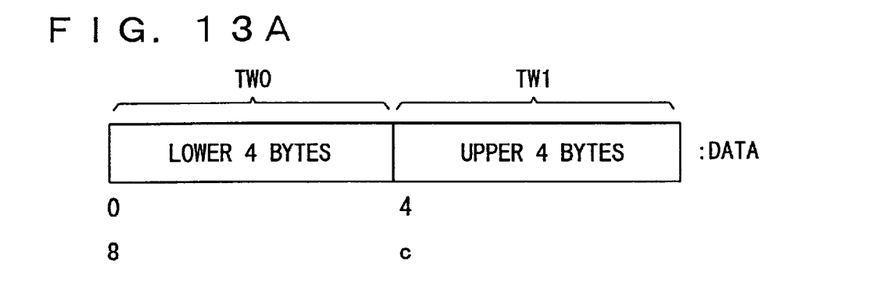
FIG. 13A is a schematic illustration showing address assignment in a normal operating mode of an internal trace memory according to the first embodiment of the present invention and FIG. 13B is a schematic illustration showing correspondence between address bit [21] and an address region.

FIG. 13A is a schematic illustration showing a structure of an address of the internal trace memory. In the internal trace memory, a write operation of the lower 4 bytes is controlled by the trace write enable signal TW0 while a write operation of data of the upper 4 bytes is controlled by the trace write enable signal TW1. Data of 8 bytes is written into the internal trace memory in the trace mode. In a case where the internal trace memory is used as a normal internal memory in the normal operating mode, there is a need of performing a write operation in a unit of 4 bytes.

In this case, the lowest address bit of the lower 4 bytes is 0 or 8 (in the hexadecimal notation) and the lowest address bit of the upper 4 bytes in the hexadecimal notation is 4 or C.

Figure 13B:
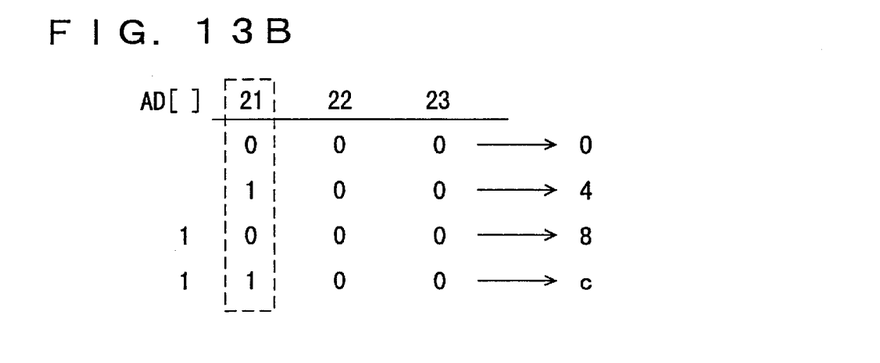

Therefore, as shown in FIG. 13B, when the lowest address bit in the hexadecimal notation is 0 or 8 in the address bits [21:23], the address bit AD[21] is 0, while when the lowest address bit in the hexadecimal notation is 4 or C, the address bit [21] is "1". Therefore, with the use of the address bit [21], a write operation of data can be performed for each 4 bytes. That is, in a case where the read/write designation signal R/W is at L level to indicate data write and further the bus strobe signal BSTR is at H level in the activation state, where the address bit [21] is at H level, which indicates a region of the upper 4 bytes, then an output signal of the AND circuit 98 is at H level and the trace write enable signal TW1 from the selector 101 is activated, whereby data write is performed to the upper 4 byte region. On the other hand, in a case where the address bit [21] is at L level, then an output signal of the inverter 94 is at H level, according to which an output signal of the AND circuit 96 comes to be at H level. Therefore, the trace write enable signal TW0 from the selector 100 is at H level and data write into the lower 4 bytes is performed. With the use of the address bit [21], the internal trace memory is used as an internal memory in the normal operating mode and data write can be performed for each 4 bytes.

It should be appreciated that the selector 87 functions in the following ways; when information on an access to a designated address region is stored in the trace mode, an output signal of the comparator 82 is selected; when data access information is written into the trace memory following designation of a specific address without any interrupt, an output signal of the flip-flop (FF) 85 is selected; and when all of internal bus access information is written into the internal trace memory, the power supply value "1" is selected. The routing in the selector 87 is also set by CPU or the external tester. Write of data signals into the trace comparison address register 80 and the comparison bit mask register 81 through the internal data bus 25 is also executed under control of CPU or the external tester (for example, such operation is realized by application of an initial setting command to CPU).

[Configuration of Trace Read Signal Generation Circuit]

Figure 14:
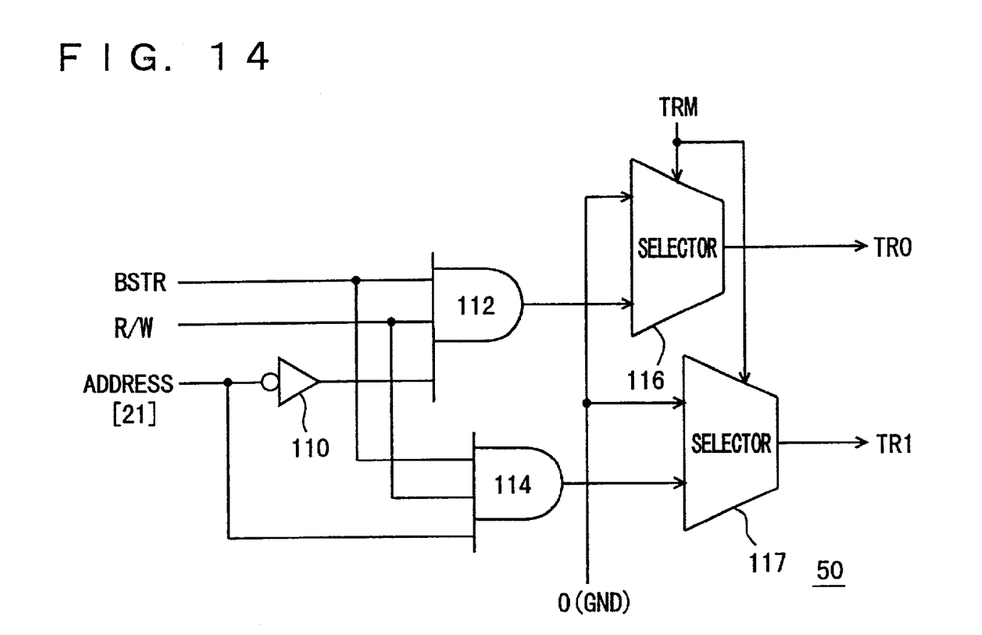
FIG. 14 is a schematic block diagram showing a configuration of a trace read signal generation circuit shown in FIG. 2.

FIG. 14 is a schematic block diagram showing a configuration of the trace read signal generation circuit 50 shown in FIG. 2. In FIG. 14, the trace read signal generation circuit 50 includes: an inverter 110 receiving the address bit [21]; an AND circuit 112 receiving the bus strobe signal BSTR, the read/write designation signal R/W and an output signal of the inverter 110; an AND circuit 114 receiving the bus strobe signal BSTR, the read/write designation signal R/W and the address bit [21]; a selector 116 selecting one of a fixed value "0" (ground potential GND) and an output signal of the AND circuit 112 to output the trace read designation signal TR0 according to the trace mode designation signal TRM; and a selector 117 selecting one of the fixed value "0" and an output of the AND circuit 114 to output the trace read designation signal TR1.

The selectors 116 and 117, in the trace mode, select the fixed value "0" and fix the trace read enable signals TR0 and TR1 at L level.

In the normal operating mode, the selectors 116 and 117 select output signals of the AND circuits 112 and 114, respectively. When the read/write designation signal R/W is at H level and data read is directed, one of the trace read enable signals TR0 and TR1 is activated according to the address bit [21] in response to activation of the bus strobe signal BSTR. That is, when the address bit [21] is at L level, an output signal of the AND circuit 112 comes to be at H level and responsively, the trace read enable signal TR0 comes into the activation state at H level. Therefore, in this state, data of the lower 4 bytes of the internal trace memory is read. On the other hand, when the address bit [21] is at H level, an output signal of the AND circuit 114 comes to be at H level and responsively, the trace read enable signal TR1 comes to be at H level and a data of the upper 4 bytes is read from the internal trace memory.

In FIGS. 11 and 14, identification of the upper 4 bytes or the lower 4 bytes of the internal trace memory is performed using the address bit [21]. When an access to the internal memory 12 is performed as well, the trace read enable signals TR0 and TR1 or the trace write enable signals TW0 and TW1 are selectively activated. However, the trace address signal generation circuit 30 shown in FIG. 2 selects the address [0:23] on the internal address bus 21 in the normal operating mode, as shown in FIG. 6, and in this case, the address decoder 32 is deactivated and no memory cell selection operation is performed even if an address outside an address region allocated to the internal trace memory is designated and therefore, a data access to the internal trace memory is not performed, thereby preventing conflict of data on the internal data bus from occurring. In a case where address spaces shown in FIG. 3 are allocated to the internal trace memory, a configuration may be adopted in which if the upper bits "20" in the hexadecimal notation are designated, the trace read signal generation circuit 50 and the trace write signal generation circuit 40 of the upper bits 20 are enabled.

[Configuration of Trace Termination Signal Generation Circuit]

Figure 15:
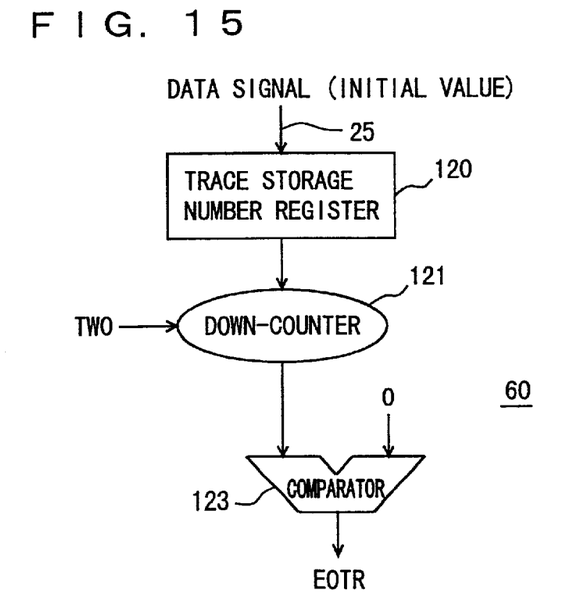
FIG. 15 is a schematic block diagram showing a configuration of the trace termination signal generation circuit shown in FIG. 2.

FIG. 15 is a schematic block diagram showing a configuration of the trace termination signal generation circuit 60 shown in FIG. 2. In FIG. 15, the trace termination signal generation circuit 60 includes: a trace storage number register 120 storing data indicating the number of trace runs; a down-counter 121 performing a count-down operation on activation of the trace write enable signal TW0 with the number of storage runs already stored in the trace storage number register 120 being an initial value; and a comparator 123 comparing a count of the down-counter 121 with the fixed value 0 and activating the trace termination signal ETOR when a count of the down-counter 121 comes to be 0.

The trace storage number register 120 stores a data signal provided through the internal data bus 25 as a storage number of trace runs under control of CPU or the external tester. A memory capacity of the internal trace memory is 8 K bytes and internal bus access information is stored into the internal trace memory for each 8 bytes in the trace mode. Therefore, the maximum value that can be set in the trace storage number register 120 is 1 K (=1024).

The trace write enable signal TW0 is activated according to a write operating mode set by the selector 87 as shown in FIG. 11. Therefore, the down-counter 121 performs a count-down operation, whereby the trace termination designation signal EOTR from the comparator 123 is activated after internal access information pieces are stored into the internal trace memory by the number of storage runs that is set in the trace storage number register 120 according to a set write operating mode.

It should be appreciated that the following procedures may be available: the down-counter 121 is configured so as not to count any more after a count thereof reaches 0. A counting operation of the down-counter 121 can be prohibited in the normal operating mode and thereby, reduction in power consumption can be realized. Further, alternatively, the down-counter 121 may be configured to perform the counting operation when the trace write designation signals TW0 and TW1 are simultaneously activated.

[Other Applications]

The numbers of I/O data bits and memory capacities of the internal memory and the trace memory are not limited to those in the descriptions of the embodiments, but may be any other than those in the descriptions, respectively. Further, the number of I/O data bits of CPU, likewise, may be another number of the bits. Still further, operating frequencies of CPU and the external interface circuit (I/F) are not limited to 200 MHz and 20 MHz, respectively, but may be other frequencies.

As has been described above, according to the present invention, an internal trace memory storing internal bus access information can be accommodated in a processor without increase in chip area, thereby making it possible for internal bus information of a high speed processor to be externally read out with ease.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A processor with an internal bus tracing function, comprising:

an internal bus including at least an internal data bus transferring internal data and an address bus transmitting an address signal, a first internal memory coupled with the internal bus, for storing the internal data on the internal data bus;

a processing unit, coupled with the internal bus, for processing at least data on the internal data bus; and a second internal memory, coupled with the internal bus, for storing information on the internal bus in a trace mode and for storing data that the processing unit uses in an operating mode other than the trace mode, wherein the second internal memory includes a control circuit for setting, in the trace mode, an input/output data bit width of the second internal memory so as to be not less than a bit width of the internal data bus, and setting, in the operating mode other than the trace mode, an input/output data bit width of the second internal memory so as to be equal to a bit width of the internal data bus.

2. A processor with an internal bus tracing function according to claim 1; wherein the control circuit sets the input/output data bit width of the second internal memory in the trace mode so as to be a natural number times a bit width of the internal data bus.

3. A processor with an internal bus tracing function according to claim 1, wherein the control circuit includes:

detection means for detecting a coincidence between a predetermined address and an address on the internal bus;

a flip-flop set in response to a coincidence signal from the detection means;

a line transmitting a fixed voltage;

selection means for selecting one of the fixed voltage on said line and outputs of the detection means and the flip-flop according to an operating mode designation; and write enable means for enabling write of data on the internal bus into the second internal memory according to an output signal of the selection means in the trace mode.

4. A processor with an internal bus tracing function according to claim 3, wherein the write enable means enables the write in response to a strobe signal indicating presence of valid data on the internal bus.

5. The processor with an internal bus tracing function according to claim 3, wherein the control circuit further includes means for generating a signal that designates termination of the trace mode when a number of generations of write enable signals enabling the write reaches a predetermined value.

6. The processor with an internal bus tracing function according to claim 1, wherein said control circuit includes a trace data bus connected to at least address bus of said internal bus; and a selector for selecting a signal on the trace data bus in the trace mode and selecting a signal on the internal data bus of said internal bus in the operation mode to output a selected signal to said second internal memory.

7. The processor with an internal bus tracing function according to claim 6, wherein said control circuit further includes a first write driver for writing a signal on said internal data bus to said second internal memory, a second write driver for writing the output of said selector to said second internal memory, and a write signal generation circuit generating write enable signals for activating said first and second write drivers simultaneously in the trace mode and for activating one of said first and second write drivers in the operation mode.

* * * * *